US012800934B2

(12) United States Patent
Ha

(10) Patent No.: US 12,800,934 B2
(45) Date of Patent: Nov. 17, 2026

(54) OPTICAL DEVICE FOR AUGMENTED REALITY USING POLARIZING OPTICAL ELEMENT

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 205 days.

(21) Appl. No.: 18/832,485

(22) PCT Filed: Jan. 9, 2023

(86) PCT No.: PCT/KR2023/000355
§ 371 (c)(1),
(2) Date: Jul. 23, 2024

(87) PCT Pub. No.: WO2023/146157
PCT Pub. Date: Aug. 3, 2023

(65) Prior Publication Data

US 2025/0155714 A1 May 15, 2025

(30) Foreign Application Priority Data

Jan. 25, 2022 (KR) ........................ 10-2022-0010800

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01)

(58) Field of Classification Search
CPC .............. G02B 27/0172; G02B 27/283; G02B 2027/0178; G02B 27/01; G02B 5/30; G02B 27/14; G02B 27/28
USPC .......................................................... 359/630
See application file for complete search history.

(56) References Cited

U.S. PATENT DOCUMENTS

2020/0201046 A1* 6/2020 Yoon ................... G02F 1/13725
2020/0225464 A1* 7/2020 Lee ....................... G06T 19/006
2021/0132270 A1* 5/2021 Ha ......................... G02B 30/00
(Continued)

FOREIGN PATENT DOCUMENTS

JP 2006-017991 A 1/2006
JP 2010-224479 A 10/2010
KR 10-2018-0028339 A 3/2018
(Continued)

*Primary Examiner* — Mohammed A Hasan
(74) *Attorney, Agent, or Firm* — Rabin & Berdo, P.C.

(57) ABSTRACT

The present invention provides an optical device for augmented reality using a polarizing optical element, the optical device including: an image output unit configured to output virtual image light, which is image light corresponding to a virtual image; a polarizing optical element configured to transfer the virtual image light, output from the image output unit, to a pupil of an eye of a user; and an optical means configured such that the polarizing optical element is disposed therein, and configured to transfer real object image light, output from a real object, to the pupil of the eye of the user by transmitting it therethrough; wherein the image output unit outputs virtual image light polarized in a first direction; and wherein the polarizing optical element transfers the virtual image light polarized in the first direction to the pupil of the eye of the user by reflecting it.

12 Claims, 12 Drawing Sheets

(56) References Cited

U.S. PATENT DOCUMENTS

| | | | | |
|---|---|---|---|---|
| 2022/0026735 | A1 * | 1/2022 | Ha | G02B 6/00 |
| 2022/0171190 | A1 * | 6/2022 | Trisnadi | G02B 27/0172 |

FOREIGN PATENT DOCUMENTS

| | | | | |
|---|---|---|---|---|
| KR | 10-2019-0063443 | A | | 6/2019 |
| KR | 10-2020-0034401 | A | | 3/2020 |
| KR | 10-2192942 | B1 | | 12/2020 |
| KR | 10-2022-0005423 | A | | 1/2022 |
| KR | 1020220006023 | A | * | 1/2022 |
| KR | 10-2022-0017455 | A | | 2/2022 |

* cited by examiner

OPTICAL DEVICE FOR AUGMENTED REALITY USING POLARIZING OPTICAL ELEMENT

TECHNICAL FIELD

The present invention relates to an optical device for augmented reality, and more particularly to an optical device for augmented reality that may increase the luminous efficiency for real object image light while maintaining the luminous efficiency for virtual image light by using a polarizing optical element.

BACKGROUND ART

Augmented reality (AR) refers to technology that superimposes a virtual image, provided by a computer or the like, on a real image of the real world and then provides a resulting image, thereby simultaneously providing the virtual image information augmented from visual information of the real world to a user, as is well known.

An apparatus for realizing such augmented reality requires an optical combiner that enables the simultaneous observation of virtual images and real images of the real world. As such optical combiners, there are known half mirror-type combiners and holographic/diffractive optical element (HOE/DOE)-type combiners.

Half mirror-type combiners have problems in that the transmittance of virtual images is low and it is difficult to provide a comfortable fit because the volume and weight thereof are increased to provide a wide FOV.

In order to reduce the volume and weight, there have also been proposed technologies such as Light-guide Optical Element (LOE), which requires a plurality of small half-mirrors to be disposed inside a waveguide. However, this technology also has limitations in that the manufacturing process is complicated and also luminous uniformity may easily be lowered due to manufacturing error because the image light of a virtual image needs to pass through the half-mirrors a number of times inside the waveguide.

Furthermore, HOE/DOE-type combiners generally employ nanostructure gratings or diffraction gratings. Since they are manufactured in a significantly precise process, the technology has limitations in that the manufacturing cost is high and the yield for mass production is low.

Furthermore, due to the difference in diffraction efficiency according to the wavelength band and the incident angle, this technology has limitations in terms of color uniformity and the low sharpness of an image. Holographic/diffractive optical elements are often used in conjunction with waveguides as in the LOEs described above. Accordingly, this technology still has the same problems as the LOEs.

Furthermore, the conventional optical combiners have limitations in that a virtual image is out of focus when a user changes a focal length when gazing at the real world. In order to overcome this problem, there has been proposed a technology using a prism capable of adjusting the focal length of a virtual image or a variable focus lens capable of electrically controlling the focal length. However, this technology also has a problem in that a user needs to perform a separate operation to adjust the focal length and also separate hardware and software are required for controlling the focal length.

In order to overcome the problems of the prior art, the present applicant has developed a technology that projects a virtual image onto the retina through the pupil by using a reflective unit in the form of a pin mirror having a smaller size than the human pupil (see prior art document 1).

FIG. 1 is a diagram showing an optical device 100 for augmented reality as described in prior art document 1.

The optical device 100 for augmented reality shown in FIG. 1 includes an optical means 10, a reflective unit 20, and an image output unit 30.

The optical means 10 is a means for serving to transmit real object image light, which is image light output from an object in the real world, therethrough to a pupil 40 and also output the virtual image light, which is reflected by the reflective unit 20, to the pupil 40. The reflective unit 20 is embedded and disposed inside the optical means 10.

The optical means 10 may be made of, e.g., a glass or transparent plastic material like a glasses lens, and may be fixed by a frame (not shown) such as a glasses frame.

The image output unit 30 is a means for outputting virtual image light. For example, the image output unit 30 may have a display unit configured to display a virtual image on a screen and output virtual image light corresponding to the displayed virtual image, and a collimator configured to collimate the image light, output from the display unit, into parallel light and output it.

The reflective unit 20 is a means for transferring the virtual image light, output from the image output unit 30, toward the pupil 40 of a user by reflecting it.

The reflective unit 20 of FIG. 1 is formed to have a smaller size than a human pupil. Since it is known that the size of the average pupil of people is about 4 to 8 mm, the reflective unit 20 is formed to have a size of preferably 8 mm or less, more preferably 4 mm or less. By this, the depth of field for light entering the pupil 40 through the reflective unit 20 may be made almost infinite.

In this case, the depth of field (DoF) refers to a range within which an image for augmented reality is recognized as being in focus. As the depth of field increases, the range of focal lengths for virtual images widens correspondingly. Accordingly, even when a user changes the focal length for the real world while gazing at the real world, the user always recognizes an image for augmented reality as being in focus regardless of such a change. This may be viewed as a type of pinhole effect.

Accordingly, by forming the reflective unit 20 to have a smaller size than the pupil 40, the user may always view a clear virtual image even when the user changes the focal length for a real object.

Furthermore, the present applicant developed an optical device 200 for augmented reality that could expand the field of view (FOV) and the eyebox, as shown in FIG. 2, based on the above-described prior art document 1.

FIG. 2 is a diagram showing the optical device 200 for augmented reality based on the technology disclosed in prior art document 2.

The optical device 200 for augmented reality shown in FIG. 2 has the same basic principle as the optical device 100 for augmented reality shown in FIG. 1, except that, in order to expand the field of view and the eyebox, a reflective unit 20 is composed of a plurality of reflective modules 21 to 29 and disposed inside an optical means 10 in an array form, and the virtual image light output from an image output unit 30 is reflected by total internal reflection (TIR) on the inner surface of the optical means 10 and transferred to the reflective unit 20.

As described above, the image output unit 30 of FIG. 2 includes a display unit 31 and a collimator 32 configured to collimate the image light, output from the display unit 31, into parallel light.

In the optical device 200 for augmented reality shown in FIG. 2, the virtual image light output from the image output unit 30 is reflected by total internal reflection on the inner surface of the optical means 10 and is then transferred to a plurality of reflective modules 21 to 29, and the plurality of reflective modules 21 to 29 transfer the incident virtual image light to the pupil 40 by reflecting it.

According to the optical device 200 for augmented having this configuration, it is possible to provide a compact optical device for augmented reality that may reduce the form factor while expanding the eyebox and the FOV.

However, the optical devices 100 and 200 for augmented reality described above use the reflective unit 20, which is a reflection means for reflecting incident light. Accordingly, the real object image light incident on the reflective unit 20 is also reflected by the reflective unit 20, so that there is a problem in that it is difficult to transmit the real object image light incident on the reflective unit 20 to the pupil 40. Therefore, the luminous efficiency for the real object image light may be reduced.

To overcome this problem, it is conceivable to use a half mirror configured to transmit part of incident light therethrough and reflect part of it instead of the reflective unit 20. However, in this case, part of the virtual image light is also transmitted through the half mirror, so that there is a problem in that the luminous efficiency for the virtual image light also decreases.

PRIOR ART LITERATURE

Prior art document 1 Korean Patent Application Publication No. 10-2018-0028339 (published on Mar. 16, 2018)

Prior art document 2: Korean Patent No. 10-2192942 (published on Dec. 18, 2020)

DISCLOSURE

Technical Problem

The present invention is intended to overcome the problems described above, and an object of the present invention is to provide an optical device for augmented reality that may increase the luminous efficiency for real object image light while maintaining the luminous efficiency for virtual image light.

Technical Solution

In order to accomplish the above-described object, the present invention provides an optical device for augmented reality using a polarizing optical element, the optical device including: an image output unit configured to output virtual image light, which is image light corresponding to a virtual image; a polarizing optical element configured to transfer the virtual image light, output from the image output unit, to a pupil of an eye of a user; and an optical means configured such that the polarizing optical element is disposed therein, and configured to transfer real object image light, output from a real object, to the pupil of the eye of the user by transmitting it therethrough; wherein the image output unit outputs virtual image light polarized in a first direction; and wherein the polarizing optical element transfers the virtual image light polarized in the first direction, output from the image output unit, to the pupil of the eye of the user by reflecting it, and transfers light polarized in a second direction perpendicular to the first direction, out of the real object image light incident onto the polarizing optical element, to the pupil of the eye of the user by transmitting it therethrough.

In this case, the polarizing optical element may be a reflective polarizing plate.

Furthermore, the image output unit may include a display unit implemented with Liquid Crystal on Silicon (LCoS).

Furthermore, a polarizing filter configured to absorb the light polarized in the first direction may be disposed on the surface of the polarizing optical element onto which the real object image light is incident.

Furthermore, the polarizing optical element may include a plurality of polarizing optical elements arranged in an array form.

According to another aspect of the present invention, there is provided an optical device for augmented reality using a polarizing optical element, the optical device including: an image output unit configured to output virtual image light, which is image light corresponding to a virtual image; an auxiliary optical element configured to convert the virtual image light, output from the image output unit, into collimated parallel light by reflecting it and output the collimated parallel light; a polarizing optical element configured to transfer the virtual image light, output from the auxiliary optical element, to a pupil of an eye of a user; and an optical means configured such that the auxiliary optical element and the polarizing optical element are disposed therein, and configured to transfer real object image light, output from a real object, to the pupil of the eye of the user by transmitting it therethrough; wherein the image output unit outputs virtual image light polarized in a first direction; and wherein the polarizing optical element transfers the virtual image light polarized in the first direction, output from the image output unit, to the pupil of the eye of the user by reflecting it, and transfers light polarized in a second direction perpendicular to the first direction, out of the real object image light incident onto the polarizing optical element, to the pupil of the eye of the user by transmitting it therethrough.

In this case, the polarizing optical element may be a reflective polarizing plate.

Furthermore, the image output unit may include a display unit implemented with Liquid Crystal on Silicon (LCoS).

Furthermore, a polarizing filter configured to absorb the light polarized in the first direction may be disposed on the surface of the polarizing optical element onto which the real object image light is incident.

Furthermore, the polarizing optical element may include a plurality of polarizing optical elements arranged in an array form.

Furthermore, the auxiliary optical element may be an optical element that transfers the virtual image light polarized in the first direction output from the image output unit to the polarizing optical element by reflecting it and transmits therethrough the light polarized in the second direction perpendicular to the first direction out of the real object image light incident onto the auxiliary optical element.

Furthermore, the optical means may have a first surface configured such that the polarized virtual image light and the real object image light are output toward the pupil of the user therethrough, and a second surface disposed opposite the first surface and configured such that the real object image light is incident thereinto, and the reflective surface of the auxiliary optical element that reflects the incident polarized virtual image light is disposed to face the first or second surface of the optical means.

Furthermore, the reflective surface of the auxiliary optical element may be a curved surface formed to be concave.

Furthermore, when the optical means is viewed in the forward direction from the pupil, the auxiliary optical element may be formed to become closer to the image output unit as it extends from the central portion thereof toward both left and right ends thereof.

Advantageous Effects

According to the present invention, there may be provided the optical device for augmented reality that may increase the luminous efficiency for real object image light while maintaining the luminous efficiency for virtual image light.

DESCRIPTION OF DRAWINGS

FIGS. 7 to 9 are diagrams illustrating an optical device (400) according to another embodiment of the present invention, wherein FIG. 7 is a side view thereof, FIG. 8 is a perspective view thereof, and FIG. 9 is a front view thereof; and FIGS. 10 to 12 are diagrams illustrating an optical device (500) according to still another embodiment of the present invention, wherein FIG. 10 is a side view thereof, FIG. 11 is a perspective view thereof, and FIG. 12 is a front view thereof.

BEST MODE

Embodiments of the present invention will be described in detail below with reference to the accompanying drawings.

Figure 3:
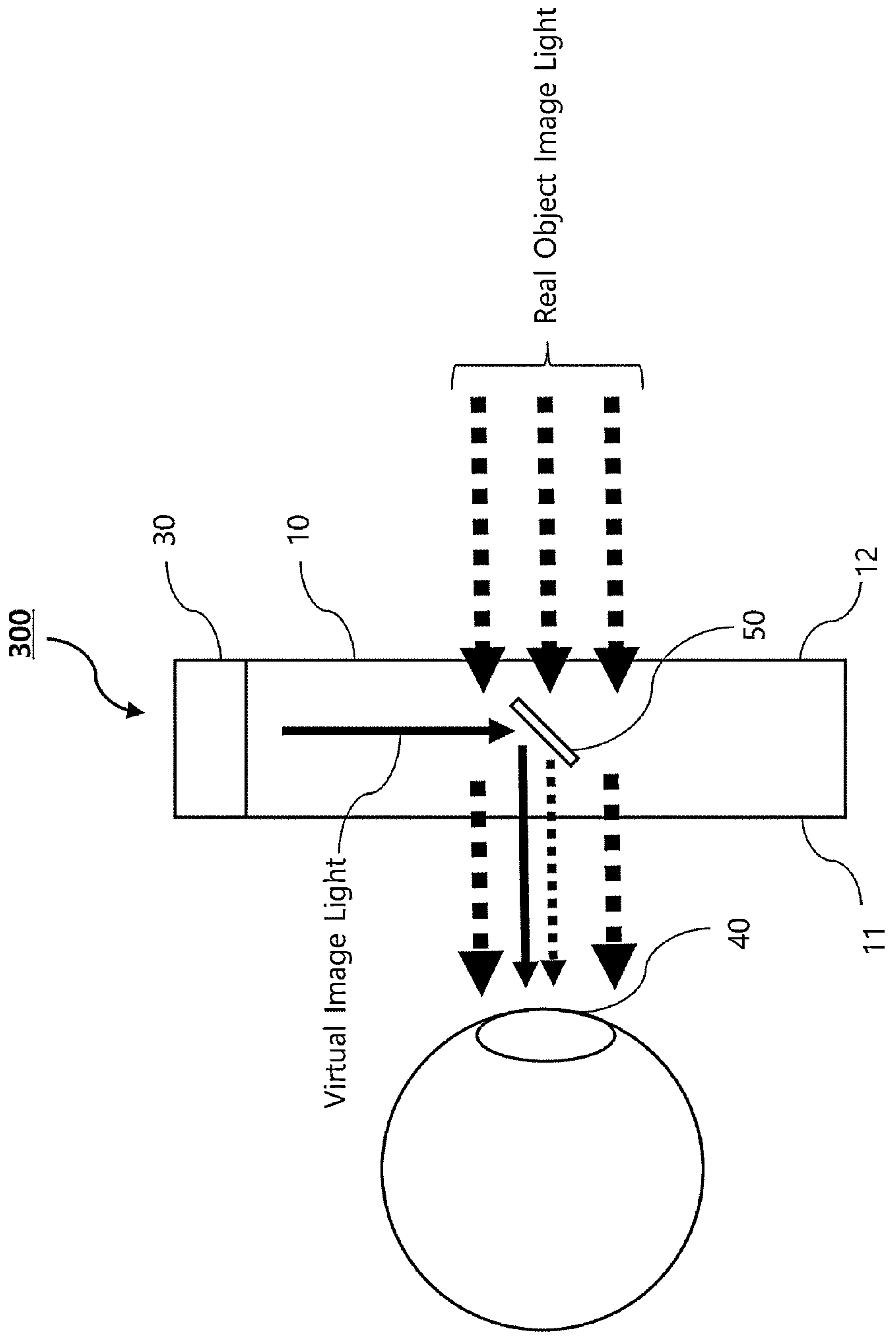
FIG. 3 shows a side view of an optical device (300) for augmented reality using a polarizing optical element according to an embodiment of the present invention.

FIG. 3 shows a side view of an optical device 300 for augmented reality using a polarizing optical element according to an embodiment of the present invention.

The optical device for augmented reality 300 using the polarizing optical element (hereinafter briefly referred to as the "optical device 300") shown in FIG. 3 includes an optical means 10, a polarizing optical element 50, and an image output unit 30.

The optical means 10 is a means for transferring the real object image light, output from a real object present in the real world, to the pupil 40 of an eye of a user by transmitting it therethrough. Furthermore, the optical means 10 functions to output the virtual image light, transferred from the polarizing optical element 50, to the pupil 40.

The optical means 10 has a first surface 11 configured such that the virtual image light and the real object image light are output toward the pupil 40 of the user therethrough, and a second surface 12 disposed opposite the first surface 11 and configured such that the real object image light is incident thereonto.

The polarizing optical element 50 is embedded and disposed inside the optical means 10 to be spaced apart from the first and second surfaces 11 and 12.

The image output unit 30 is a means for outputting virtual image light, which is image light corresponding to a virtual image. In this case, the virtual image refers to an image for augmented reality, and may be a still image or moving image.

Since the image output unit 30 itself is not a direct target of the present invention and is known in the prior art, a detailed description thereof will be omitted here. However, the image output unit 30 in the present invention is characterized by outputting the virtual image light polarized in a specific direction.

As is well known, general light may vibrate in all directions in a plane perpendicular to the direction in which the light propagates due to the random nature of a light source that generates electromagnetic waves.

When this light vibrates only in one specific direction, it is called polarized light. Accordingly, the virtual image light polarized in a specific direction means the virtual image light that vibrates only in a specific direction out of virtual image light.

Hereinafter, the polarization direction of the polarized virtual image light output from the image output unit 30 will be referred to as the first direction.

The image output unit 30 may include a display unit implemented with a conventionally known micro-display device such as a small LCD, OLED, LCoS, or micro-LED, or the like, and a collimator configured to collimate the virtual image light output from the display unit and output it as parallel light.

The image output unit 30 preferably includes a display unit configured to output the virtual image light polarized in a specific direction, such as Liquid Crystal on Silicon (LCoS), so that it can output the virtual image light polarized in the first direction.

When a display unit configured to output unpolarized virtual image light such as an OLED is used, the display unit may be constructed by additionally disposing a polarizing filter.

Although the polarized virtual image light output from the image output unit 30 is shown as being directly transferred to the polarizing optical element 50 in FIG. 3, this is an example. The polarized virtual image light may be transferred to the polarizing optical element 50 through at least one total internal reflection (TIR) on the inner surface of the optical means 10.

Furthermore, although the image output unit 30 is shown as being disposed on the top of the optical means 10 in FIG. 3, this is an example. It is obvious that the image output unit 30 may be disposed at other locations.

The polarizing optical element 50 is a means for transferring the virtual image light, output from the image output unit 30, to the pupil 40 of an eye of a user.

In particular, the polarizing optical element 50 of the present invention is characterized by reflecting the light polarized in a specific direction and transmitting therethrough the light polarized in a direction perpendicular to the specific direction.

That is, the polarizing optical element 50 is characterized by transferring the virtual image light polarized in the first direction, output from the image output unit 30, to the pupil 40 of the eye of the user by reflecting it and also transferring the light polarized in a second direction perpendicular to the first direction, out of the real object image light incident onto the polarizing optical element 50, to the pupil 40 of the eye of the user by transmitting it therethrough.

In this case, the light polarized in the second direction means the light polarized in a direction perpendicular to the first direction.

For example, when the light polarized in the first direction is called s-polarized light, the light polarized in the second direction becomes p-polarized light. When the polarizing optical element 50 reflects the s-polarized light, the p-polarized light is transmitted throughout.

As the polarizing optical element 50, there may be used a reflective polarizing plate that reflects the light polarized in a specific direction and transmits therethrough the light polarized in a direction perpendicular to the specific direction.

As such a reflective polarizer, there may be used elements such as a polarizing beam splitter (PBS), a multilayer reflective polarizing plate, and a wire grid polarizing plate. These elements may reflect the light polarized in a specific direction and transmit therethrough the light polarized in a direction perpendicular to the specific direction by utilizing the principle of multilayer intramembrane interference or Brewster's angle, by utilizing the principle of birefringence, or by utilizing the interaction of light with a metal nanowire structure.

Figure 4:
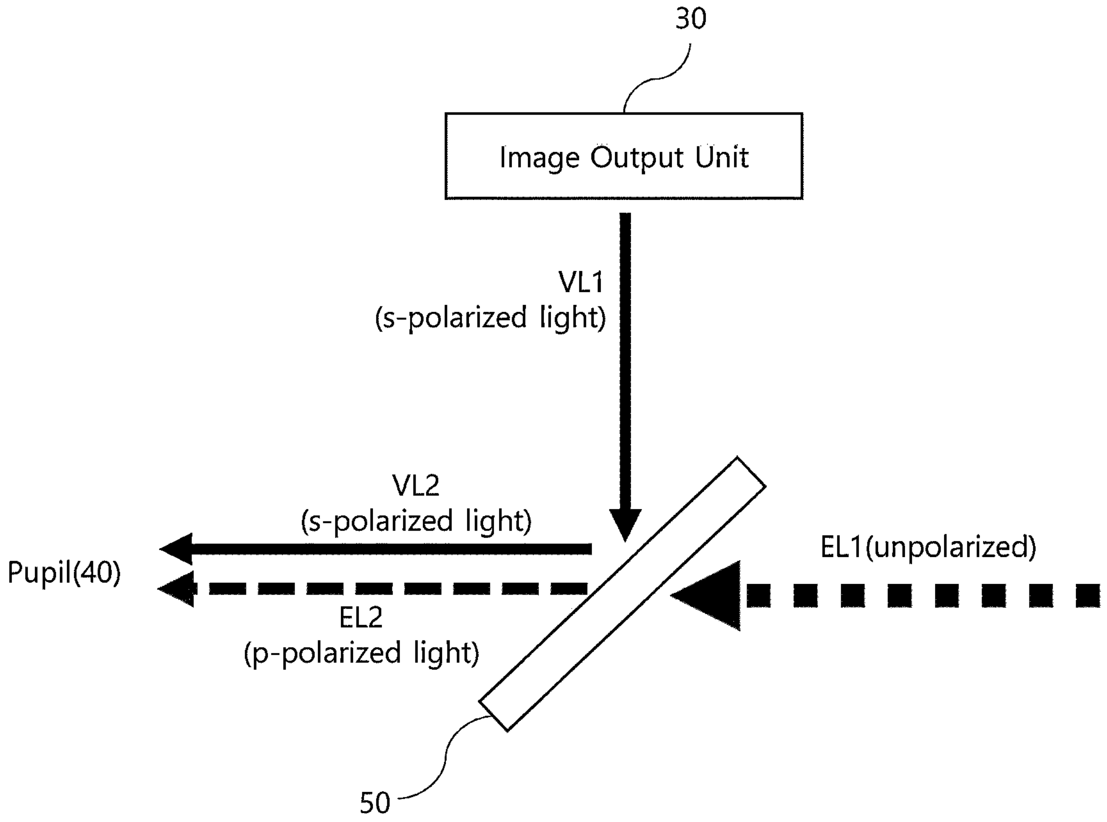
FIG. 4 is a diagram illustrating the operation of a polarizing optical element (50)

FIG. 4 is a diagram illustrating the operation of the polarizing optical element 50, which shows only the image output unit 30 and the polarizing optical element 50 for convenience of description.

Referring to FIG. 4, the image output unit 30 outputs the virtual image light VL1 polarized in the first direction. In this case, it is assumed that the virtual image light VL1 polarized in the first direction is s-polarized light.

As described above, the polarizing optical element 50 outputs the virtual image light VL1 polarized in the first direction to the pupil 40 by reflecting it.

Accordingly, the virtual image light VL2 output from the polarizing optical element 50 is also s-polarized light. Assuming that the reflectance of the polarizing optical element 50 for s-polarized light is 100%, the amounts of light of VL1 and VL2 are the same in principle.

Meanwhile, the polarizing optical element 50 transfers the real object image light polarized in the second direction perpendicular to the first direction, out of the unpolarized real object image light EL1 incident onto the polarizing optical element 50, to the pupil 40 by reflecting it.

Therefore, the real object image light EL2 transmitted through and output from the polarizing optical element 50 is p-polarized light. It can be seen that the amount of light of the real object image light EL2 corresponds to approximately 50% of the amount of light of the unpolarized real object image light EL1.

As described above, the polarizing optical element 50 reflects only s-polarized light, so that the luminous efficiency for virtual image light can be maintained when the image output unit 30 outputs the virtual image light that is s-polarized light.

Figure 1:
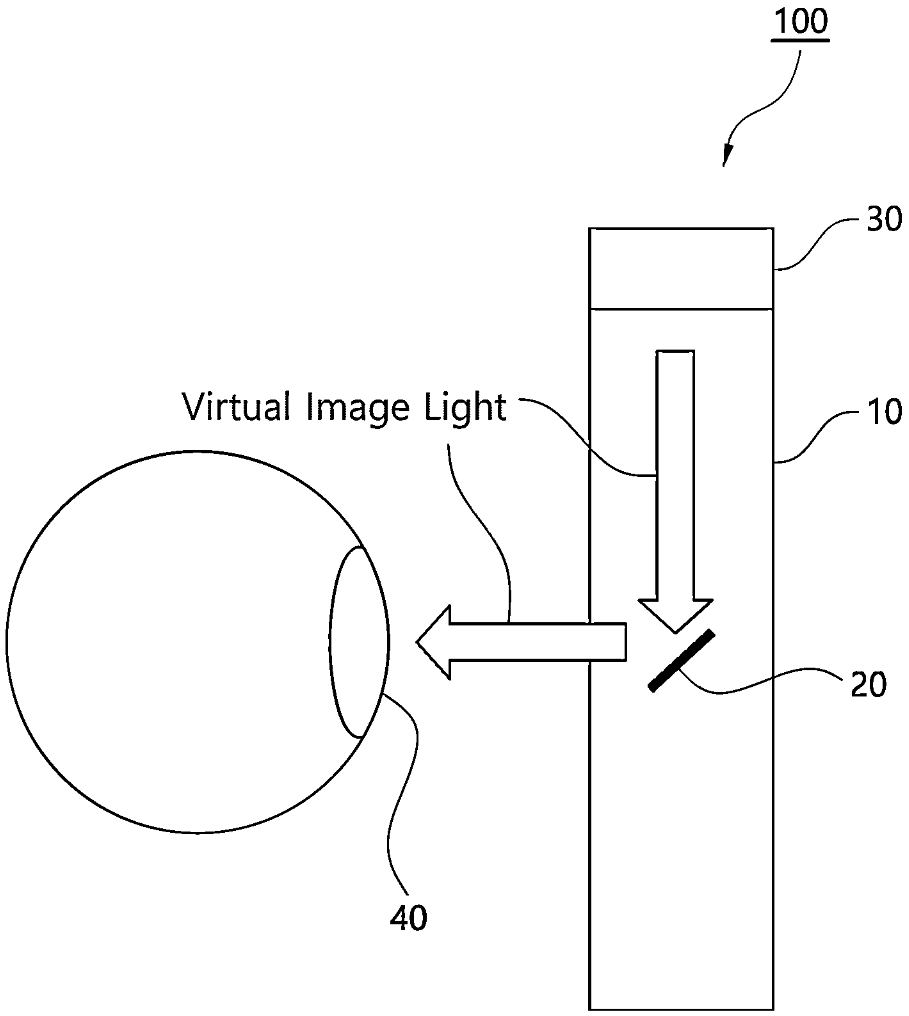
FIG. 1 is a diagram showing an optical device (100) for augmented reality as described in prior art document 1.
Figure 2:
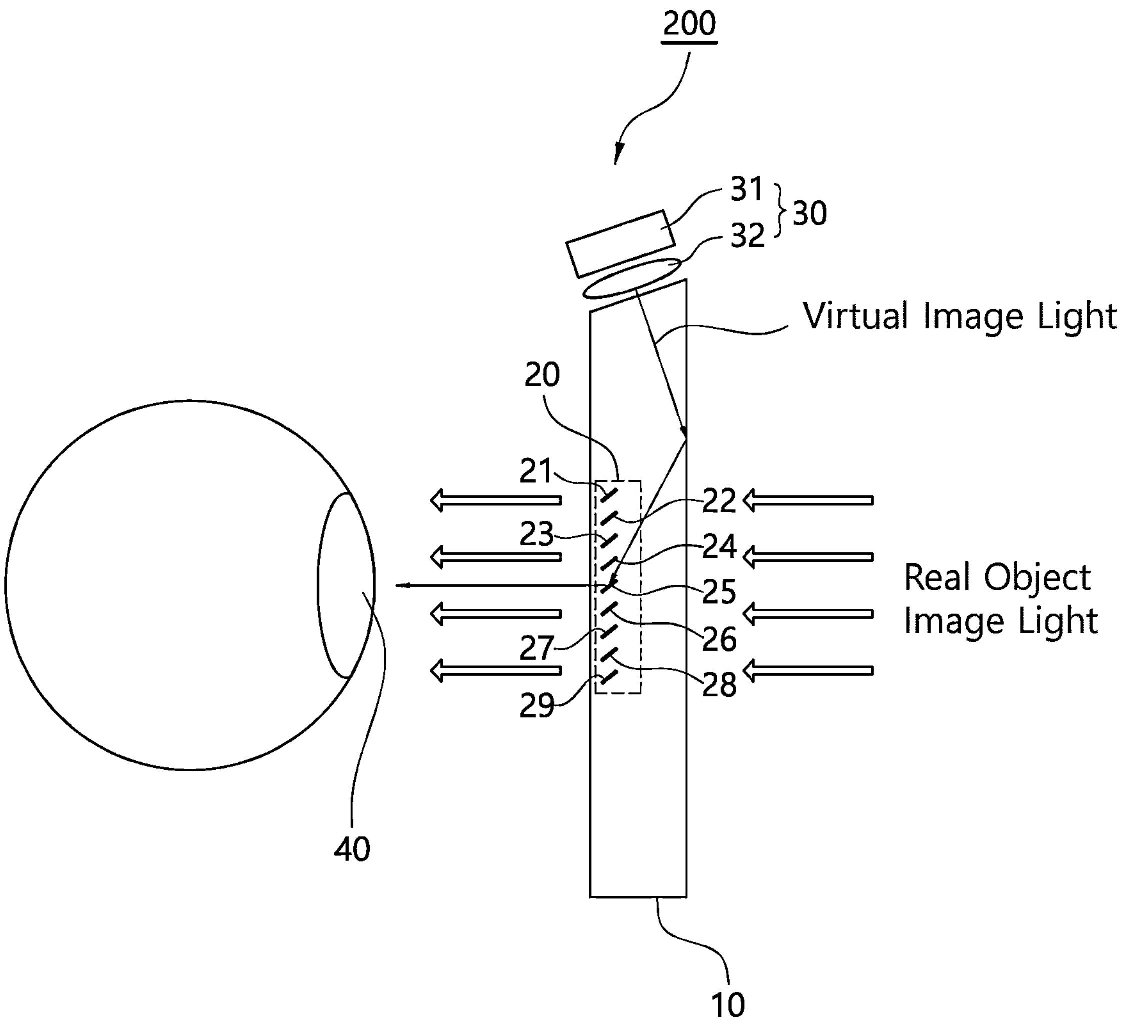
FIG. 2 is a diagram showing an optical device (200) for augmented reality based on the technology disclosed in prior art document 2.

Furthermore, the polarizing optical element 50 transmits p-polarized light therethrough, so that it can transfer p-polarized light out of real object image light to the pupil 40 by transmitting it therethrough. Accordingly, there is an advantage in that the luminous efficiency for real object image light can be increased compared to the optical devices 100 and 200 for augmented reality shown in FIGS. 1 and 2.

Meanwhile, as described above, the polarizing optical element 50 reflects s-polarized light and transmits p-polarized light throughout, so that the polarizing optical element 50 can reflect s-polarized light out of real object image light.

Figure 5:
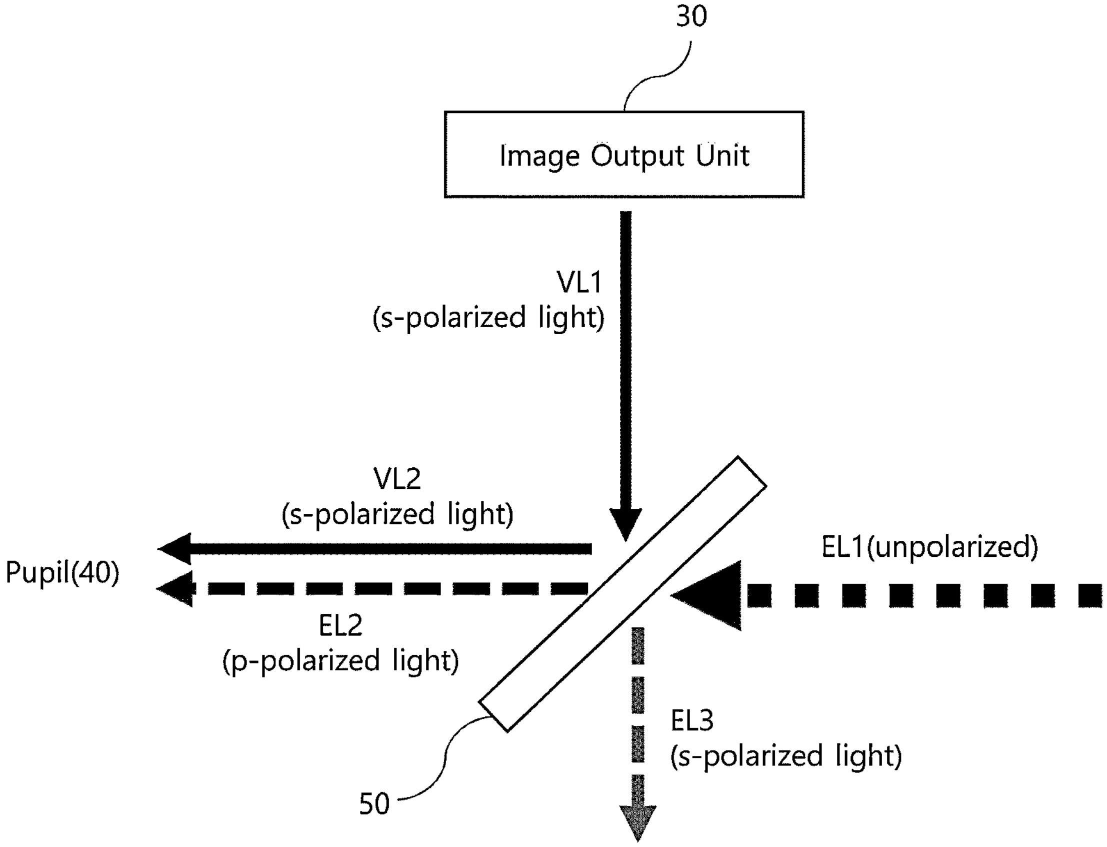
FIG. 5 is a diagram illustrating the polarized light reflected by the polarizing optical element (50) out of real object image light.

FIG. 5 is a diagram illustrating the polarized light reflected by the polarizing optical element 50 out of real object image light.

As shown in FIG. 5, out of the real object image light, the light EL3 polarized in the first direction, i.e., s-polarized light, may be reflected from the polarizing optical element 50, which may serve as a factor in the generation of a ghost image.

To overcome this problem, a method of disposing a polarizing filter configured to block light polarized in a first direction on the polarizing optical element 50 may be taken into consideration.

Figure 6:
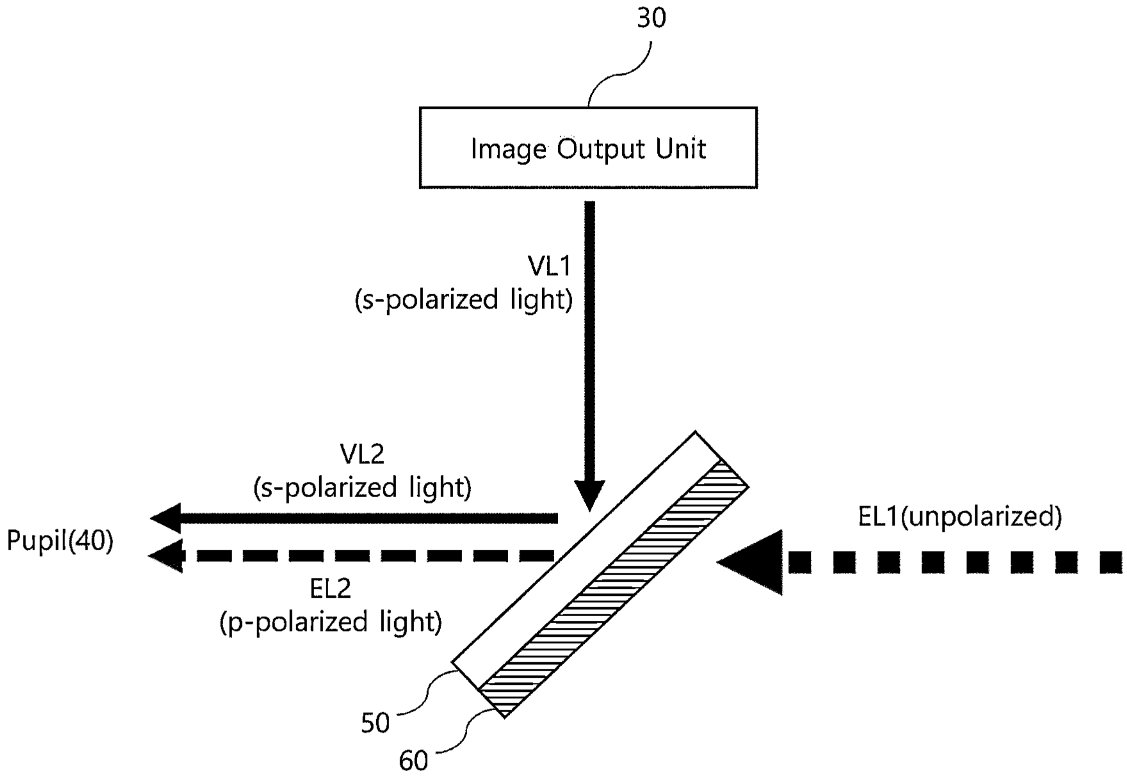
FIG. 6 shows an example in which a polarizing filter (60) is additionally disposed on the polarizing optical element (50)

FIG. 6 shows an example in which a polarizing filter 60 is additionally disposed on the polarizing optical element 50.

As shown in FIG. 6, the polarizing filter 60 may be disposed on the surface of the polarizing optical element 50 onto which real object image light is incident.

The polarizing filter 60 functions to absorb the light polarized in the direction of the polarized light reflected by the polarizing optical element 50, i.e., the first direction. Furthermore, the polarizing filter 60 transmits therethrough the light polarized in a direction perpendicular to the first direction.

Accordingly, it may be possible to block the polarized light reflected from the polarizing optical element 50 out of the real object image light.

Meanwhile, as described in the background art section above, the polarizing optical element 50 is preferably formed to be smaller than the average size of the human pupil, i.e., 8 mm or less, more preferably 4 mm or less, in order to achieve a pinhole effect by increasing the depth of field.

Accordingly, the depth of field for the light incident onto the pupil 40 may be made almost infinite, i.e., considerably deep, by the polarizing optical element 50. Therefore, there may be generated a pinhole effect that allows a virtual image to be always recognized as being in focus regardless of a change in the focal length even when a user changes the focal length for the real world while gazing at the real world.

In this case, the size of the polarizing optical element 50 is defined as the maximum length between any two points on the edge boundary line of the polarizing optical element 50.

Meanwhile, when the size of the polarizing optical element 50 is excessively small, a diffraction phenomenon increases, so that the size of the polarizing optical element 50 is preferably larger than, for example, 0.3 mm.

Furthermore, the shape of the polarizing optical element 50 may be circular.

Furthermore, the polarizing optical element 50 may be formed in an elliptical shape so that it appears circular when viewed from the pupil 40.

Figure 7:
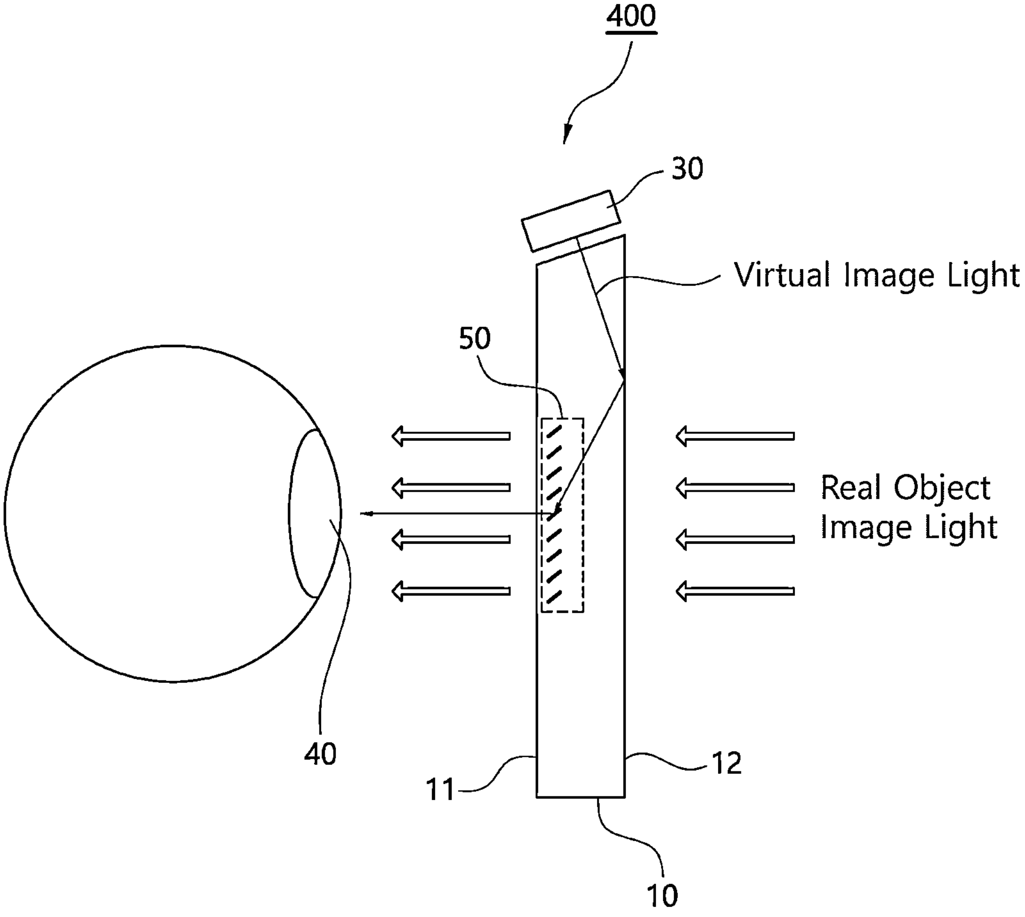
Figure 8:
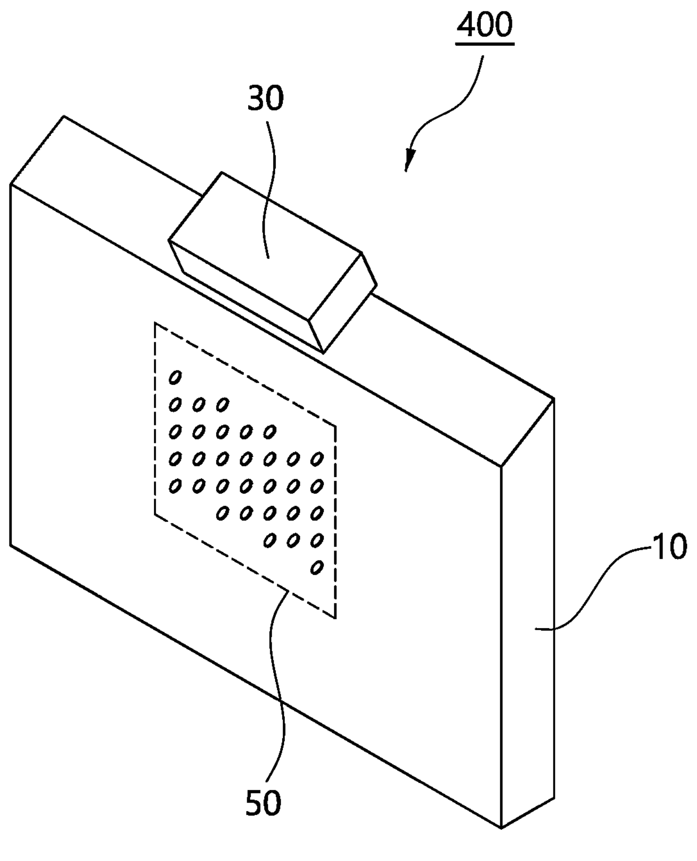
Figure 9:
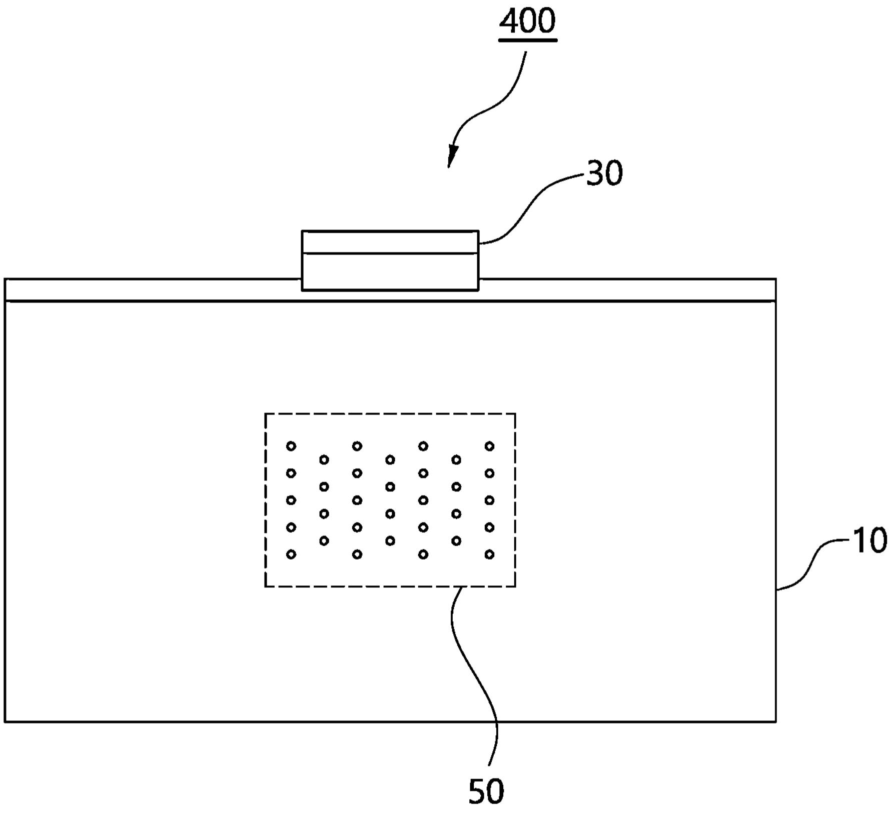

FIGS. 7 to 9 are diagrams illustrating an optical device 400 according to another embodiment of the present invention, wherein FIG. 7 is a side view thereof, FIG. 8 is a perspective view thereof, and FIG. 9 is a front view thereof.

The optical device 400 of FIGS. 7 to 9 has the same basic principle as the optical device 300 of FIG. 3, except that a plurality of polarizing optical elements 50 are arranged inside an optical means 10 in an array form.

In the embodiments of FIGS. 7 to 9, the virtual image light polarized in a first direction output from an image output unit 30 is output toward the second surface 12 of the optical means 10, is reflected by a total internal reflection on the second surface 12 of the optical means 10, and is then transferred to the plurality of polarizing optical elements 50.

As described above, the plurality of polarizing optical elements 50 transfer the virtual image light polarized in the first direction to the pupil 40 by reflecting it, and also transfer the light polarized in a second direction perpendicular to the first direction, out of the real object image light incident onto the polarizing optical elements 50, to the pupil 40 by transmitting it therethrough.

Accordingly, the plurality of polarizing optical elements 50 are each disposed at an appropriate inclination angle with respect to the first and second surfaces 11 and 12 of the optical means 10 in order to transfer polarized virtual image light incident along this optical path to the pupil 40.

Furthermore, each of the plurality of polarizing optical elements 50 is preferably disposed not to block virtual image light transferred from the image output unit 30 from being transferred to other polarizing optical elements 50.

For example, the plurality of polarizing optical elements 50 may be arranged in a column along a vertical line when the optical device 400 is viewed from the side in the form shown in FIG. 7.

Alternatively, the plurality of polarizing optical elements 50 may be arranged along an inclined diagonal line or gentle curved line when the optical device 400 is viewed from the side.

Figure 10:
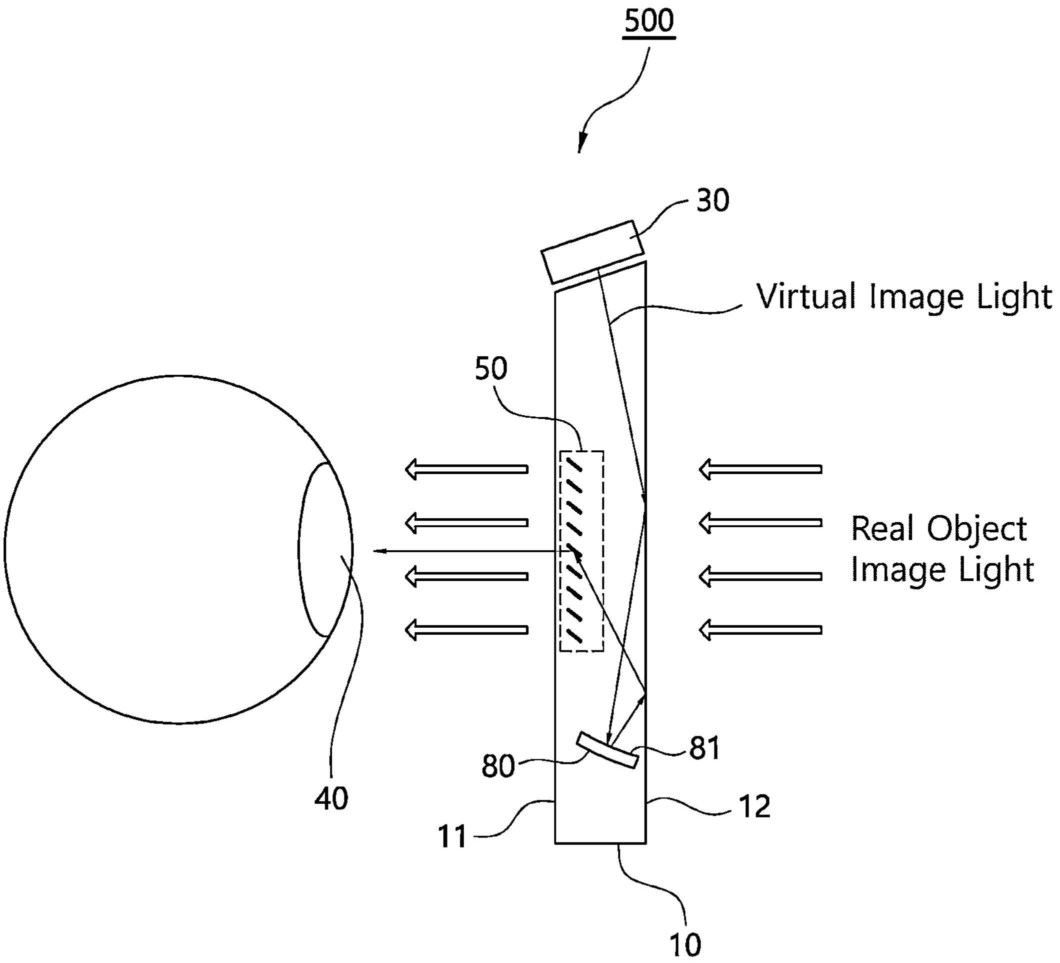
Figure 11:
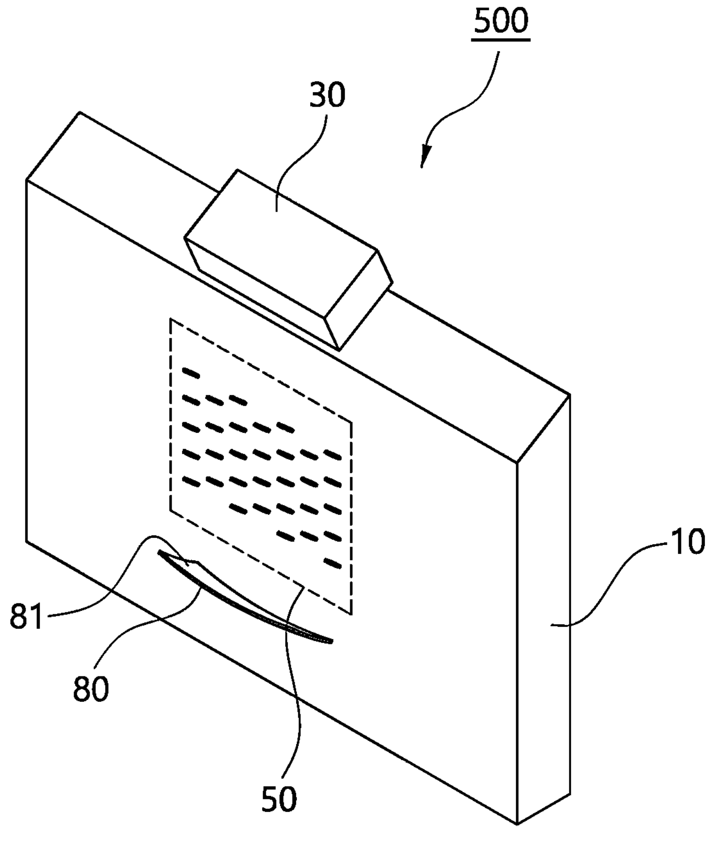
Figure 12:
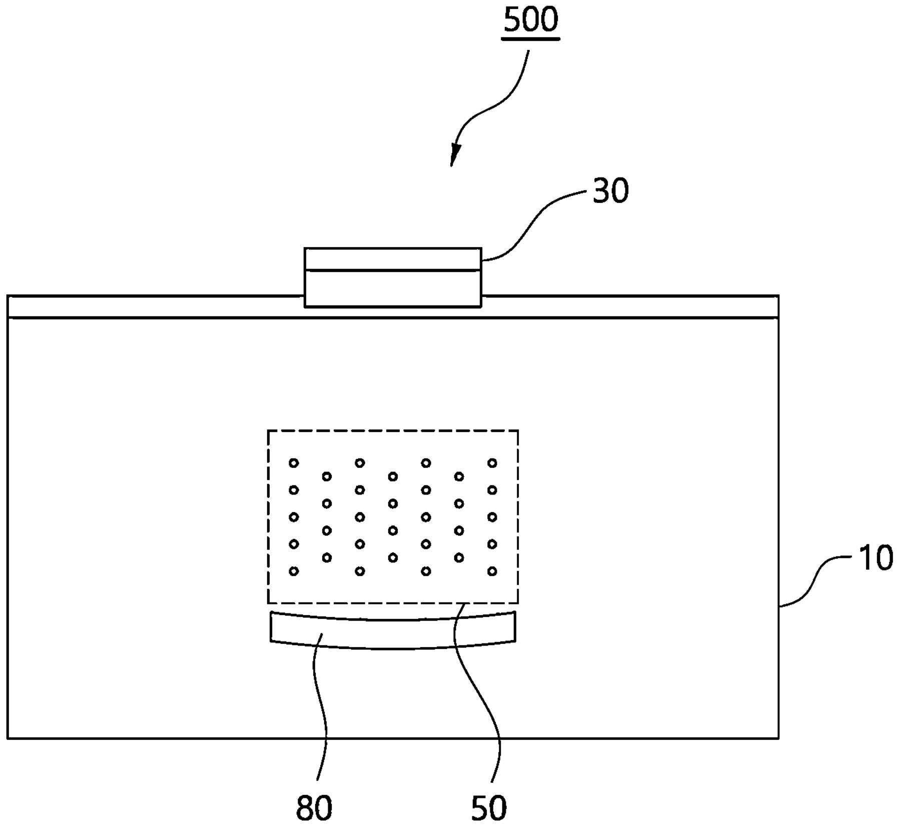

FIGS. 10 to 12 are diagrams illustrating an optical device 500 according to still another embodiment of the present invention, wherein FIG. 10 is a side view thereof, FIG. 11 is a perspective view thereof, and FIG. 12 is a front view thereof.

The optical device 500 of FIGS. 10 to 12 has the same basic principle as the optical device 400 of FIGS. 7 to 9, except that an auxiliary optical element 80 configured to function as a collimator is embedded and installed inside the optical means 10.

Accordingly, the image output unit 30 of the optical device 500 does not need to include a component such as a collimator, which provides the advantage of reducing the form factor of the optical device 500.

The auxiliary optical element 80 functions to convert the virtual image light output from the image output unit 30 into collimated parallel light by reflecting it and then output it.

Accordingly, the virtual image light output from the auxiliary optical element 80 is collimated parallel light or image light having an intended focal length.

The virtual image light reflected and output from the auxiliary optical element 80 is transferred to the polarizing optical elements 50.

The auxiliary optical element 80 may be implemented as a reflective means for reflecting incident virtual image light and outputting it as collimated parallel light. For example, the auxiliary optical element 80 may be made of a material having a high reflectance of 100% or close to 100%, such as a metal material.

Meanwhile, the auxiliary optical element 80 may also be implemented as an optical element having the properties of the polarizing optical element 50 as described above.

That is, the auxiliary optical element 80 may be implemented as an optical element that transfers the virtual image light polarized in the first direction, output from the image output unit 30, to the polarizing optical elements 50 by reflecting it and also transmits the light polarized in the second direction perpendicular to the first direction out of the real object image light incident onto the auxiliary optical element 80.

As shown in FIGS. 10 to 12, the auxiliary optical element 80 is embedded and disposed inside the optical means 10 to face the image output unit 30.

As shown in FIG. 10, the image output unit 30 outputs the virtual image light polarized in the first direction toward the second surface 12 of the optical means 10, and the polarized virtual image light reflected by total internal reflection on the second surface 12 of the optical means 10 is transferred to the auxiliary optical element 80.

The polarized virtual image light converted into collimated parallel light by and output from the auxiliary optical element 80 is reflected again by total internal reflection on the second surface 12 of the optical means 10 and is then transferred to the polarizing optical elements 50.

The polarizing optical elements 50 transfer incident polarized virtual image light to the pupil 40 by reflecting it, as described in the above-described embodiments.

Accordingly, the auxiliary optical element 80 is disposed at an appropriate location inside the optical means 10 between the first and second surfaces 11 and 12 of the optical means 10 by taking into consideration the relative locations of the image output unit 30, the polarizing optical elements 50, and the pupil 40 so that the polarized virtual image light can be transferred to the polarizing optical elements 50 along the above-described optical path.

In the embodiment of FIGS. 10 to 12, the auxiliary optical element 80 is embedded and disposed inside the optical means 10 so that the reflective surface 81 that reflects the polarized virtual image light faces the second surface 12 of the optical means 10.

In this case, a straight line in the vertical direction from the center of the reflective surface 81 and the second surface 12 of the optical means 10 may be inclined to each other so that they are not parallel to each other.

However, this is an example. It will be obvious that the auxiliary optical element 80 is embedded and disposed inside the optical means 10 so that the reflective surface 81 of the auxiliary optical element 80 faces toward the first surface 11 of the optical means 10.

Meanwhile, the reflective surface 81 of the auxiliary optical element 80 may be formed as a curved surface. For example, the reflective surface 81 of the auxiliary optical element 80 may be formed to be concave in the direction of the second surface 12 of the optical means 10, as shown in FIGS. 10 to 12.

With this configuration, the auxiliary optical element 80 may function as an embedded collimator that is embedded in the optical means 10 and collimates the polarized virtual image light output from the image output unit 30. Accordingly, there is no need to use a component such as a collimator in the image output unit 30.

Furthermore, it is preferable that the auxiliary optical element 80 appear thin when a user looks straight ahead through the pupil 40 so that the user rarely recognizes it.

Meanwhile, the auxiliary optical element 80 may be composed of a means such as a half mirror that partially reflects light.

Furthermore, the auxiliary optical element 80 may be formed of a refractive or diffractive element other than a reflective means, or may be formed of a combination of at least one thereof.

Furthermore, the auxiliary optical element 80 may be formed of an optical element such as a notch filter that selectively transmits light therethrough depending on the wavelength.

Furthermore, the surface opposite to the reflective surface 81 of the auxiliary optical element 80 may be coated with a material that absorbs light rather than reflecting it.

Meanwhile, as shown in FIGS. 11 and 12, when the optical means 10 is viewed in the forward direction from the pupil 40, the auxiliary optical element 80 may be formed to become closer to the image output unit 30 as it extends from the central portion thereof toward both left and right ends thereof.

That is, the auxiliary optical element 80 may be formed in the overall shape of a gentle "U"-shaped bar when viewed from the front thereof. This may further improve the function of the auxiliary optical element 80 serving as a collimator.

Meanwhile, even in the case of the optical device 500 of FIGS. 10 to 12, it is obvious that only one polarizing optical element 50 may be employed, as previously described in conjunction with FIG. 3.

Although the present invention has been described above with reference to preferred embodiments of the present invention, the present invention is not limited to the above embodiments. It is obvious that other various modifications and alterations may be made to the present invention.

The invention claimed is:

1. An optical device for augmented reality using a polarizing optical element, the optical device comprising:

an image output unit configured to output virtual image light, which is image light corresponding to a virtual image;

a polarizing optical element configured to transfer the virtual image light, output from the image output unit, to a pupil of an eye of a user; and an optical means configured such that the polarizing optical element is disposed therein, and configured to transfer real object image light, output from a real object, to the pupil of the eye of the user by transmitting it the real object image light through the optical means;

wherein the image output unit outputs virtual image light polarized in a first direction;

wherein the polarizing optical element transfers the virtual image light polarized in the first direction, output from the image output unit, to the pupil of the eye of the user by reflecting the virtual image light polarized in the first direction, and transfers light polarized in a second direction perpendicular to the first direction present in real object image light incident onto the polarizing optical element, to the pupil of the eye of the user by transmitting it the light polarized in the second direction through the polarizing optical element; and wherein a polarizing filter is disposed on a surface of the polarizing optical element onto which the real object image light is incident, the polarizing filter configured to transmit the light polarized in the second direction present in the real object image light incident onto the polarizing optical element, and to absorb light polarized in the first direction present in the real object image light incident onto the polarizing optical element, to prevent the light polarized in the first direction present in the real object image light from being reflected from the polarizing optical element.

2. The optical device of claim 1, wherein the polarizing optical element is a reflective polarizing plate.

3. The optical device of claim 1, wherein the image output unit comprises a display unit implemented with Liquid Crystal on Silicon (LCoS).

4. The optical device of claim 1, wherein the polarizing optical element comprises a plurality of polarizing optical elements arranged in an array form.

5. An optical device for augmented reality using a polarizing optical element, the optical device comprising:

an image output unit configured to output virtual image light, which is image light corresponding to a virtual image;

an auxiliary optical element configured to convert the virtual image light, output from the image output unit, into collimated parallel light by reflecting the virtual image light, and output the collimated parallel light;

a polarizing optical element configured to transfer the collimated parallel light, output from the auxiliary optical element, to a pupil of an eye of a user; and an optical means configured such that the auxiliary optical element and the polarizing optical element are disposed therein, and configured to transfer real object image light incident onto the polarizing optical element and real object image light incident onto the auxiliary optical element, output from a real object, to the pupil of the eye of the user by transmitting it the real object image light through the optical means;

wherein the image output unit outputs virtual image light polarized in a first direction; and wherein the polarizing optical element transfers the virtual image light polarized in the first direction, output from the image output unit, to the pupil of the eye of the user by reflecting the virtual image light polarized in the first direction, and transfers light polarized in a second direction perpendicular to the first direction present in the real object image light incident onto the polarizing optical element to the pupil of the eye of the user by transmitting the light polarized in the second direction through the polarizing element; and wherein a polarizing filter is disposed on a surface of the polarizing optical element onto which the real object image light is incident, the polarizing filter configured to transmit the light polarized in the second direction present in the real object image light incident onto the polarizing optical element, and to absorb light polarized in the first direction present in the real object image light incident onto the polarizing optical element, to prevent the light polarized in the first direction present in the real object image light from being reflected from the polarizing optical element.

6. The optical device of claim 5, wherein the polarizing optical element is a reflective polarizing plate.

7. The optical device of claim 5, wherein the image output unit comprises a display unit implemented with Liquid Crystal on Silicon (LCoS).

8. The optical device of claim 5, wherein the polarizing optical element comprises a plurality of polarizing optical elements arranged in an array form.

9. The optical device of claim 5, wherein the auxiliary optical element is an optical element that transfers the virtual image light polarized in the first direction output from the image output unit to the polarizing optical element by reflecting the virtual image light polarized in the first direction, and transmits through the auxiliary optical element the light polarized in the second direction perpendicular to the first direction present in the real object image light incident onto the auxiliary optical element.

10. The optical device of claim 5, wherein:

the optical means has a first surface configured such that the virtual image light polarized in the first direction and the real object image light are output toward the pupil of the user through the first surface, and a second surface disposed opposite the first surface and configured such that the real object image light is incident onto the second surface; and a reflective surface of the auxiliary optical element that reflects virtual image light polarized in the first direction incident onto the reflective surface is disposed to face the first or second surface of the optical means.

11. The optical device of claim 10, wherein the reflective surface of the auxiliary optical element is a curved surface formed to be concave.

12. The optical device of claim 5, wherein, when the optical means is viewed in a forward direction from the pupil, left and right ends of the auxiliary optical element extend from a central portion of the auxiliary optical element to become closer to the image output unit.

* * * * *